(12) United States Patent
Nishikawa

(10) Patent No.: US 6,535,338 B2
(45) Date of Patent: Mar. 18, 2003

(54) MICROLENS ARRAY, METHOD OF MANUFACTURING THE SAME, AND OPTICAL DEVICE AND ELECTRONIC APPARATUS USING THE SAME

(75) Inventor: Takao Nishikawa, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/035,026

(22) Filed: Dec. 21, 2001

(65) Prior Publication Data

US 2002/0145807 A1 Oct. 10, 2002

(30) Foreign Application Priority Data

Dec. 27, 2000  (JP) .......................................... 2000-397015

(51) Int. Cl.[7] .............................................. G02B 27/10
(52) U.S. Cl. ....................................................... 359/619
(58) Field of Search ................................. 359/619, 620, 359/621; 65/17.3; 264/1.32

(56) References Cited

U.S. PATENT DOCUMENTS 5,536,455 A  *  7/1996 Aoyama et al. ............. 264/1.7
5,694,246 A  *  12/1997 Aoyama et al. ............ 356/619

* cited by examiner

*Primary Examiner*—Ricky Mack
(74) *Attorney, Agent, or Firm*—Harness, Dickey & Pierce, P.L.C.

(57) ABSTRACT

A method of manufacturing a microlens array comprises the steps of providing a first light transmitting layer precursor above a master to form a first light transmitting layer; and providing a second light transmitting layer precursor above the first light transmitting layer to form a second light transmitting layer.

The master comprises a plurality of first areas and a second area surrounding the first areas and having a lower affinity to the first light transmitting layer precursor than that of the first areas.

The first light transmitting layer is formed above the first areas, but not above the second area.

31 Claims, 7 Drawing Sheets

(A)

(B)

(A)

(B)

(C)

MICROLENS ARRAY, METHOD OF MANUFACTURING THE SAME, AND OPTICAL DEVICE AND ELECTRONIC APPARATUS USING THE SAME

TECHNICAL FIELD

The present invention relates to microlens arrays, to methods of manufacturing the microlens arrays, and to optical devices and electronic apparatuses using the microlens arrays.

BACKGROUND ART

Microlens arrays comprising a plurality of very small lenses arranged therein have been used in, for example, liquid crystal display panels. Using a microlens array for a liquid crystal display allows lenses to focus incident light on individual pixels, thereby achieving a bright display.

For manufacturing microlens arrays, a method has been known which includes preparing a master having a pattern according to the lenses and transferring the pattern into a transparent resin. This method, however, requires a lot of equipment for preparing the master and high cost for running the equipment, and therefore cost reduction is limited.

SUMMARY OF THE INVENTION

An object of the present invention is to provide a method of manufacturing a microlens array with a simple process, a microlens array manufactured by the method, and an optical device using the microlens array.

A method of manufacturing a microlens array according to the present invention comprises the steps of providing a first light transmitting layer precursor above a master to form a first light transmitting layer; and providing a second light transmitting layer precursor above the first light transmitting layer to form a second light transmitting layer.

The master comprises a plurality of first areas and a second area surrounding the first areas and having a lower affinity to the first light transmitting layer precursor than that of the first areas.

The first light transmitting layer is formed above the first areas but not above the second area.

DESCRIPTION OF THE EMBODIMENTS

Figure 1:
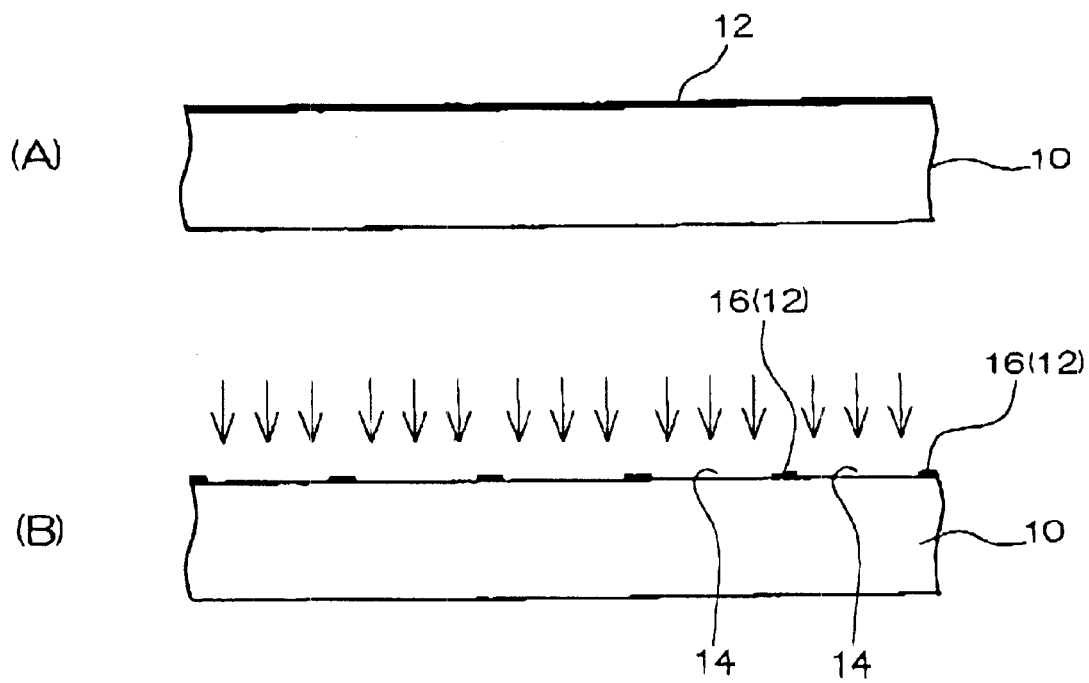
FIGS. 1(A) and 1(B) are drawings showing a master used in a first embodiment of the present invention.

A method of manufacturing a microlens array according to the present invention comprises the steps of providing a first light transmitting layer precursor above a master to form a first light transmitting layer; and providing a second light transmitting layer precursor above the first light transmitting layer to form a second light transmitting layer.

The master comprises a plurality of first areas and a second area surrounding the first areas and having a lower affinity to the first light transmitting layer precursor than that of the first areas.

The first light transmitting layer is formed above the first areas but not above the second area. According to the invention, since the second area repels the first light transmitting layer precursor, the first light transmitting layer precursor is readily provided above the first areas, while avoiding the second area. The first light transmitting layer formed above the first areas results in a plurality of lenses, and thus a microlens array can be manufactured using a simple process.

Preferable embodiments will now be described.

In the method of manufacturing the microlens array, preferably, the first light transmitting layer precursor is provided so as to have curved surfaces formed by surface tension above each first area, thereby facilitating the formation of lenses having curved surfaces.

In the method of manufacturing the microlens array, after the first light transmitting layer precursor is cured, preferably, the second light transmitting layer precursor is provided above the first light transmitting layer, thereby preventing admixing with the first light transmitting layer precursor.

In the method of manufacturing the microlens array, preferably, each first area may be formed as a circle, and thus circular lenses can be formed.

In the method of the microlens array, preferably, each first area may be formed as octagon in which opposing sides have substantially the same length; adjoining sides have different lengths from each other; and the inner angles are substantially the same, and thus octagonal lenses can be formed.

In the method of manufacturing the microlens array, preferably, the first light transmitting layer precursor is provided above the first and second areas of the master. The first light transmitting layer precursor is repelled from the second area due to the low affinity of the second area to the first light transmitting layer precursor, and thus moves to the first areas. Thus, the first light transmitting layer precursor is readily and quickly provided above the first areas.

In the method of manufacturing the microlens array, preferably, the first light transmitting layer precursor may be provided individually above each first area. This ensures that the first light transmitting layer precursor is provided above every first area. Also, in the method of manufacturing the microlens array, preferably, a plurality of coloring materials may be used as the first light transmitting layer precursor and are provided so that adjacent first areas have different colors from each other. Thus, a microlens array capable of serving as color filters can be manufactured.

In the method of manufacturing the microlens array, preferably, the first areas may be formed in the surface of the master itself. The second area is formed with a film having a lower affinity to the first light transmitting layer precursor than that of the surface of the master, thereby easily having a different affinity to the first light transmitting layer precursor from that of the first areas.

In the method of manufacturing the microlens array, preferably, the first and the second light transmitting layers may be separated from the master together. Consequently, the microlens array includes the first and the second light transmitting layers and does not include the master. In addition, preferably after being separated from the master together with the second transmitting layer in the method of manufacturing the microlens array, preferably, the first transmitting layer is removed from the second light transmitting layer to form recessed parts. The recessed parts are filled with a third light transmitting layer precursor different from the first light transmitting layer precursor. Hence, the first light transmitting layer precursor is temporally used in the process and is not included in the completed lenses. A suitable material for the process, therefore, can be used for the first light transmitting layer precursor and a suitable material for the lenses can be used for the third light transmitting layer precursor. In addition, in the method of manufacturing the microlens array, preferably, a plurality of coloring materials may be used as the third light transmitting layer precursor, and consequently, the resulting microlens array can serve as color filters.

An optical device comprising the microlens array described above is provided as a preferable embodiment. The optical device, preferably, may comprise a light source for emitting light to the microlens array. The optical device, more preferably, comprises imaging elements which the light focused by the microlens array enters.

Preferable embodiments of the present invention will now be specifically described with reference to drawings.

(First Embodiment)

FIGS. 1(A) and 1(B) show a master used in a first embodiment. The planar shape of the surface of the master 10 is not limited, and it may have a circular form or a polygonal form, such as a rectangle. If the master 10 is to remain to serve as part of the microlens array, the material of the master 10 is not limited as long as it has optical properties including optical transparency and other properties, such as mechanical strength, which satisfy the requirements of the microlens array. For example, a substrate or a film made of quartz, glass, or plastic such as polycarbonate, polyacrylate, polyether sulfone, polyethylene terephthalate, polymethylmethacrylate, or amorphous polyolefin can be used. If the master 10 is removed in a subsequent step, it does not need to be optically transparent.

Next, a step of giving selectivity to properties of the surface of the master 10 is performed. To give selectivity to surface properties of the master 10 means to form areas having surface properties, such as wettability, different from a material provided above the surface of the master 10. Specifically, a plurality of first areas 14 having an affinity to a first light transmitting layer precursor 20 and a second area 16 having a lower affinity to the first light transmitting layer precursor 20 than that of the first areas 14 are formed. For example, the first areas 14 may be formed in the surface of the master 10, and the second area 16 is formed of a material having a lower affinity to the first light transmitting layer precursor 20 than that of the master 10. In contrast, if the surface of the master 10 has a low affinity to the first light transmitting layer precursor 20, the second area 16 may be formed in the surface of the master 10 and the first areas 14 are formed of a material having a higher affinity than that of the surface of the master 10. Using such a difference in the properties of the surfaces, the first areas 14 can be selectively provided with the first light transmitting layer precursor 20 in the following step.

In this embodiment, a layer 12 is formed above the surface (for example, the entire surface) of the master 10, as shown in FIG. 1(A). Then, part of the layer 12 is removed from areas corresponding to the first areas 14 and remains at the second area 16, as shown in FIG. 1(B). The layer 12 has a lower affinity to the first light transmitting layer precursor 20 than that of the surface of the master 10. Details are described in the following steps.

The layer 12 may be formed by a vapor deposition method, such as CVD, or by another method, such as spin coating or dipping, using a liquid-phase. If the liquid-phase method is applied, a substance dissolved in a liquid or a solvent is used. For example, a silane coupling agent (an organic silicon compound) or a thiol compound may be used. The thiol compound here is the generic name of an organic compound ($R^1$—SH, wherein $R^1$ is a hydrocarbon substituent, such as an alkyl group) having a mercapto group (—SH). Such a thiol compound is dissolved in an organic solvent, such as dichloromethane or trichloromethane, to prepare a solution of about 0.1 to 10 mM.

The silane coupling agent means a compound represented by $R^2_n SiX_{4-n}$, (n is a natural number; $R^2$ is H or a hydrocarbon substituent, such as an alkyl group), wherein X is —$OR^3$, —COOH, —$OOCR^3$, —$NH_{3-n}R^3_n$, —OCN, a halogen, or the like ($R^3$ is a hydrocarbon substituent, such as an alkyl group). Of the silane coupling agents or the thiol compounds, a compound with fluorine of which particularly $R^1$ or $R^3$ is expressed by $C_n F_{2n+1} C_n H_{2m}$ (n-and m are natural numbers) is preferably used because it has a high surface free energy which leads to low affinity to other materials.

Also, the layer 12 may be formed with a film made of a compound having a mercapto group or —COOH by a method described above. The film may be used in a state of a unimolecular layer or a layer laminating the unimolecular layer by an appropriate method.

The layer 12 is removed from areas corresponding to the first areas 14, as shown FIG. 1(B); hence, the first areas 14 are formed to expose the surface of the master 10. When, for example, the silane coupling agent is used for the layer 12, exposure light can break the bonding of the molecules at the surface of the master 10 to remove the layer 12 in some cases. Light exposure with a mask, which is used in lithography, may be applied to such a patterning by means of light. Alternatively, a laser, an electron beam, or an ion beam may be directly used in order to pattern, instead of using the mask.

Figure 2:
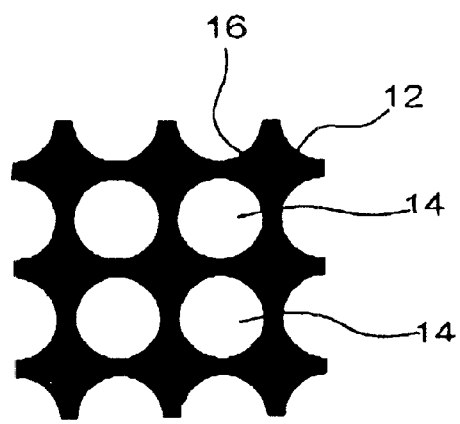
FIG. 2 is a drawing showing the master used in the first embodiment of the present invention.

FIG. 2 shows part of the layer 12. In this embodiment, the first areas 14 each having a circular form are surrounded by the second area 16. The first areas 14 with this form will result in circular lenses in plan view.

Figure 3:
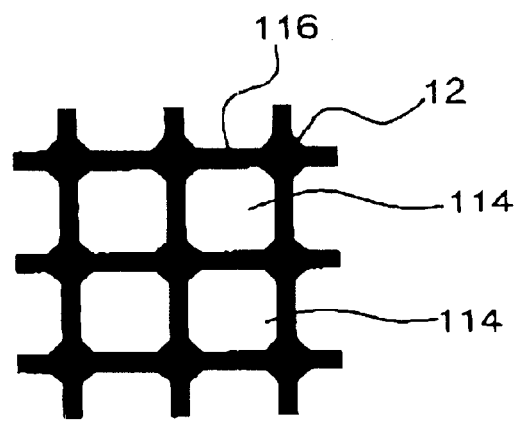
FIG. 3 is a drawing showing a modification of the master used in the first embodiment.

As a modification, octagonal first areas 114 may be formed, as shown in FIG. 3. Specifically, in each octagonal area, opposing sides have substantially the same lengths; adjoining sides have different lengths from each other; and the inner angles are substantially the same. The first areas 114 with this form will result in octagonal lenses (described above in detail) in plan view.

The layer 12 may be formed above another base material and then transferred to the area corresponding to the second area 16, thereby being selectively formed into the second area 16. Hence, patterning is achieved concurrently with the formation of the layer.

Thus, the first areas 14 and the second area 16 formed with the layer 12 have different surface states and different affinities to the first light transmitting layer precursor 20 from each other. In particular, when the layer 12 has a low affinity to the first light transmitting layer precursor 20, which may be due to fluorine contained in the layer 12, the first light transmitting layer precursors 20 are selectively provided in the first areas 14.

Figure 4:
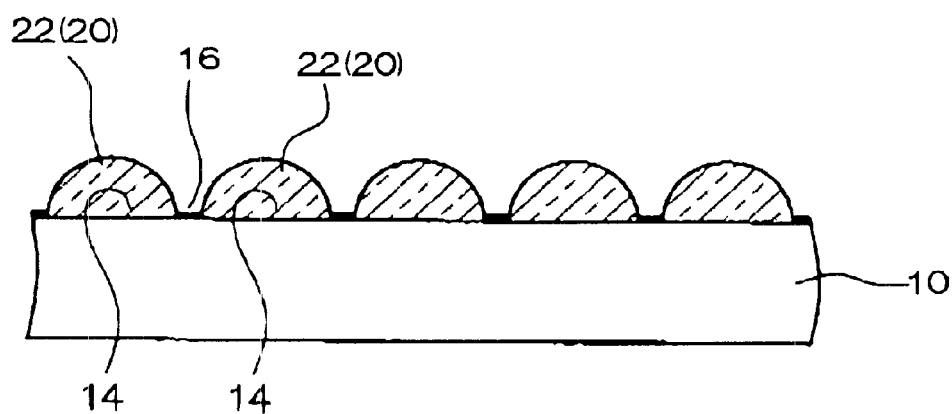
FIG. 4 is a drawing showing a method of manufacturing a microlens array according to the first embodiment.

The first light transmitting layer 22 is formed by providing the first light transmitting layer precursor 20 above the first areas 14, as shown in FIG. 4. For this purpose, first, the first light transmitting layer precursor 20 is provided above the master 10. The first areas 14 have an affinity to the first light transmitting layer precursor 20, and the second area 16 has a low affinity to the first light transmitting layer precursor 20. The first light transmitting layer precursor 20, therefore, can stay above the first areas 14, but is repelled from the second area 16. Even if the first light transmitting layer precursor 20 is provided above the entirety of the first and second areas 14 and 16, it is repelled from the second area 16 and moves to the first areas 14.

Preferably, the first light transmitting layer precursor 20 has curved surfaces formed by surface tension above the first areas 14. For example, a sufficient amount of the first light transmitting layer precursor 20 is provided so as to be heaped up above the first areas 14.

In this instance, the first light transmitting layer precursor 20 is liquid matter or matter capable of being formed into liquid. An energy-setting substance is used as the liquid matter and a plastic substance is used as the matter capable of being formed into liquid.

The first light transmitting layer precursor 20 is not limited as long as it has properties, including optical transparency, required when the first light transmitting layer 22 is formed, but preferably it is a resin. Resins are readily available, each in energy-setting or plastic, and therefor favorable.

Preferably, the energy-setting resin is a resin capable of being cured by applying light or heat. Using light or heat allows general-purpose exposure systems or heating devices, such as baking ovens and hot plates, to be used, thereby helping to reduce and minimize equipment costs.

Exemplary energy-setting resins include acrylic resins, epoxy resins, melamine resins, and polyimide resins. In particular, acrylic resins are favorable because a wide range of commercially available precursors and photosensitizers (photopolymerization initiators) can be used so that the resins are cured in a short time by light.

Specific examples of the basic composition of a photosetting acrylic resin include prepolymers, oligomers, monomers, and photopolymerization initiators.

Exemplary prepolymers and oligomers include: acrylates such as epoxy acrylates, urethane acrylates, polyester acrylates, polyether acrylates, and spiroacetal acrylates; and methacrylates such as epoxy methacrylates, urethane methacrylates, polyester methacrylates, and polyether methacrylate.

Exemplary monomers include: monofunctional monomers such as 2-ethylhexyl acrylate, 2-ethylhexyl methacrylate, 2-hydroxyethyl acrylate, 2-hydroxyethyl methacrylate, N-vinyl-2-pyrrolidone, carbitol acrylate, tetrahydrofurfuryl acrylate, isobornyl acrylate, dicyclopentenyl acrylate and 1,3-butanediol acrylate; bifunctional monomers such as 1,6-hexanediol diacrylate, 1,6-hexanediol dimethacrylate, neopentyl glycol diacrylate, neopentyl glycol dimethacrylate, ethylene glycol diacrylate, polyethylene glycol diacrylate, and pentaerythritol diacrylate; and polyfunctional monomers such as trimethylolpropane triacrylate, trimethylolpropane trimethacrylate, pentaerythritol triacrylate, and dipentaerythritol hexacrylate.

Exemplary photopolymerization initiators include: acetophenone compounds such as 2,2-dimethoxy-2-phenyl acetophenone; butyl phenone compounds such as α-hydroxy isobutyl phenone and p-isopropyl-α-hydroxy isobutyl phenone; halogenated acetophenone compounds such as p-tert-butyl dichloro acetophenone, p-tert-butyl trichloro acetophenone, and α,α-dichlor-4-phenoxy acetophenone; benzophenone compounds such as benzophenone and N,N-tetraethyl-4,4-diaminobenzophenone; benzyl compounds such as benzyl and benzyldimethyl ketal; benzoin compounds such as benzoin and benzoinalkylether; oximes such as 1-phenyl-1,2-propanedione-2-(o-ethoxycarbonyl) oxime; xanthone compounds such as 2-methylthio xanthone and 2-chlorothio xanthone; and radical forming compounds such as Michler's ketone and benzyl methyl ketal.

An amine or another compound may be added, as necessary, to prevent oxygen from inhibiting the curing, or solvent components may be added to facilitate the coating. The solvent components include, but are not limited to, organic solvents, such as propylene glycol monomethylether acetate, methoxymethyl propionate, ethoxyethyl propionate, ethyl lactate, ethyl pyruvinate, and methyl amyl ketone.

Exemplary plastic resins include thermoplastic resins, such as polycarbonate resin, polymethylmethacrylate resin, and amorphous polyolefin resin. Such a resin is heated to the softening point temperature or more to be plasticized so as to be used in a liquid state.

Thus, the first light transmitting layer 22 is formed by providing the first light transmitting layer precursor 20 in the first areas 14, as shown in FIG. 4. Preferably, the first light transmitting layer precursor 20 is cured. For example, if an energy-setting resin (for example, a photosetting resin) is used, energy (for example, light) is emitted under predetermined conditions. Thus, the first light transmitting layer precursor 20 is hardened (cured). When the master 10 has energy transmission characteristics (for example, optical transparency), energy (for example, light) may be transmitted through the master 10. Also, when a plasticized resin, by heating to the softening point temperature or more, is used as the first light transmitting layer precursor 20, the first light transmitting layer precursor 20 is cured by cooling.

Figure 5:
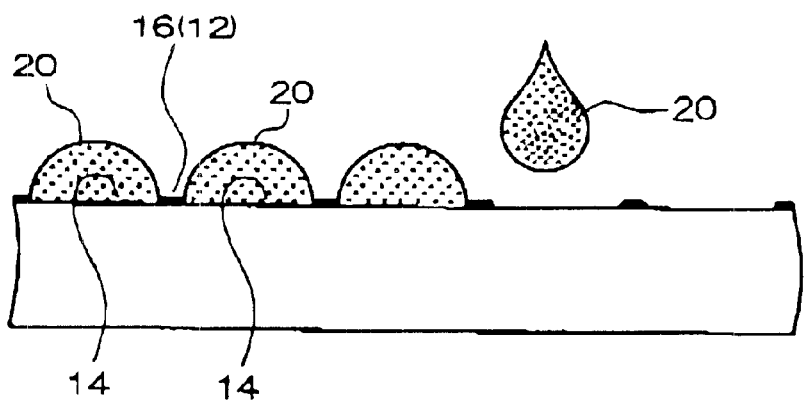
FIG. 5 is a drawing showing a method of manufacturing a microlens array according to a modification.

In a modification, the first light transmitting layer precursor 20 is provided individually above each first area 14, as shown in FIG. 5. For example, an ink-jet method may be used, thereby ensuring that the first light transmitting layer precursor 20 is provided above the first areas 14, but not above the second area 16. In this instance, a coloring material may be used as the first light transmitting layer precursor 20. By providing coloring materials for different colors above adjacent first areas 14, a microlens array capable of serving as color filters can be manufactured. Alternatively, a color material for a single color may be used as the first light transmitting layer precursor 20.

Figure 6:
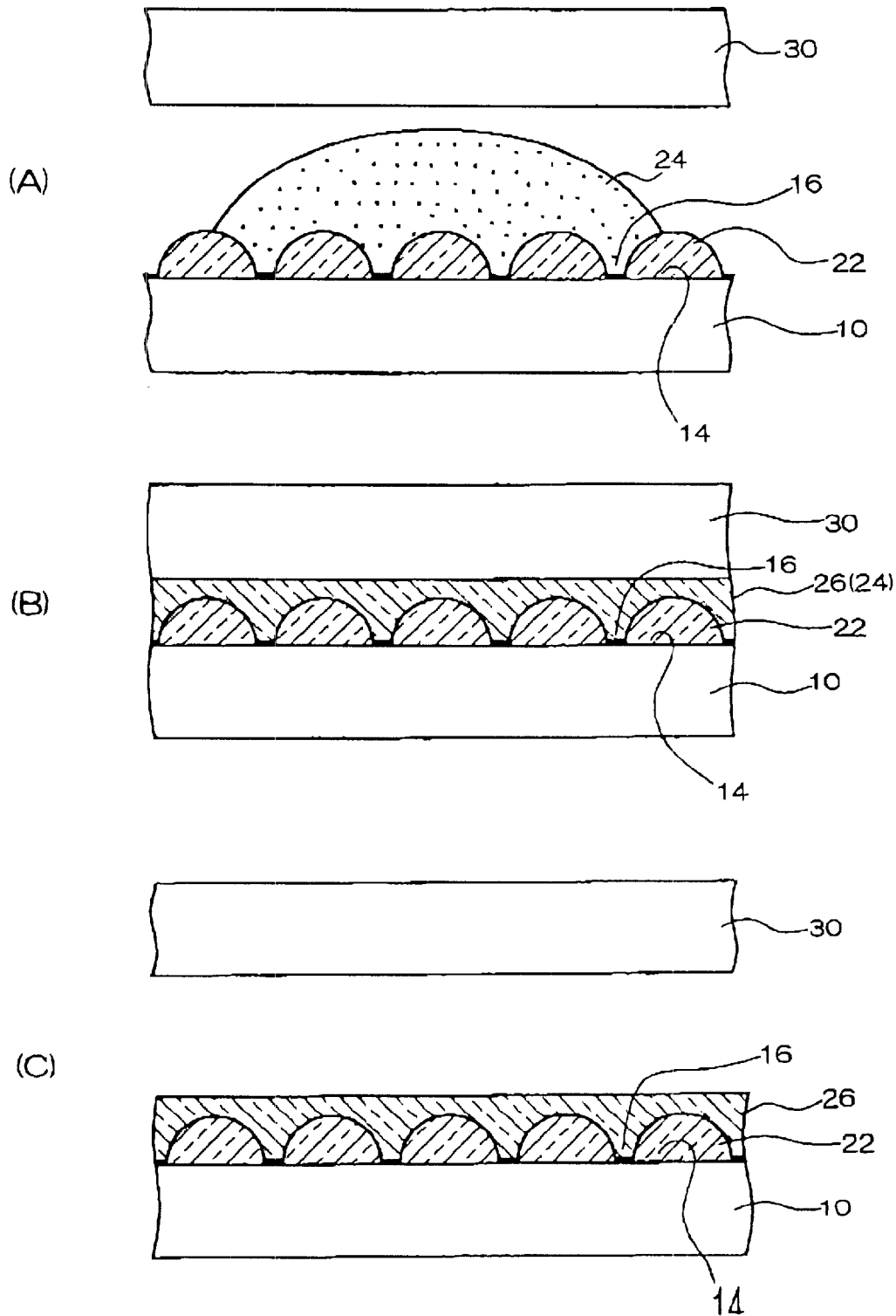
FIGS. 6(A) to 6(C) are drawings showing the method of manufacturing the microlens array according to the first embodiment.

Next, the second light transmitting layer precursor 24 is provided above the first light transmitting layer 22, as shown in FIG. 6(A), and then the second light transmitting layer 26 is formed, as shown in FIG. 6(B). Preferably, the second light transmitting layer precursor 24 is provided after the first light transmitting layer precursor 20 is cured. For the second light transmitting layer precursor 24, a material described as the materials for the first light transmitting layer precursor 20 may be used. However, different materials must be used as each of the first and the second light transmitting layer precursors 20 and 24 so that the interface between the first and the second light transmitting layers 22 and 26 having different refractive indexes from each other can refract light.

Preferably, the second light transmitting layer 26 is formed so as to cover the entire first light transmitting layer 22 formed in a plurality of first areas 14, thereby collectively holding the entire first light transmitting layer 22, which is composed of a plurality of separate portions thereof, above the plurality of first areas 14, by the second light transmitting layer 26.

Details of the process will now be described. First, a substrate 30 is brought into close contact with the master 10 having the first light transmitting layer 22 with the second light transmitting layer precursor 24 being therebetween, thereby spreading the second light transmitting layer precursor 24 over a predetermined area. A material described as the materials for the master 10 may be used for the substrate 30. The second light transmitting layer precursor 24 may be pressed from the master 10 side or the substrate 30 side. Applying a pressure allows the second light transmitting layer precursor 24 to spread out quickly to improve the work efficiency, and ensures that the second light transmitting layer precursor 24 fills the second area 16, where the first light transmitting layer 22 is not formed. The second light transmitting layer precursor 24 provided according to the above is cured to form the second light transmitting layer 26.

FIG. 6(A) shows, as an example, that the second light transmitting layer precursor 24 is provided above the master 10 having the first light transmitting layer 22 thereon. As a modification, the master 10 may overlay the substrate 30 which is provided with the second light transmitting layer precursor 24 thereon. Alternatively, the second light transmitting layer precursor 24 may be provided above both the first light transmitting layer 22 and the substrate 30.

Thus, the second light transmitting layer 26 is formed above the first light transmitting layer 22, as shown in FIG. 6(B). Then, curing suitable for the second light transmitting layer precursor 24 is applied, specifically, in the same manner as in the first light transmitting layer precursor 20. If the second light transmitting layer precursor 24 has energy-setting characteristics (for example, photosetting characteristics), the substrate 30 or the master 10 must have energy transmitting characteristics (for example, optical transparency).

The substrate 30 is separated from the second light transmitting layer 26, as shown in FIG. 6(C). Alternatively, the substrate 30 may remain to serve as part of the microlens array, specifically, in the same manner as the case in which the master 10 remains to serve as part of the microlens array. The step shown in FIG. 6(C) may be performed after the step shown in FIG. 7(A).

Figure 7:
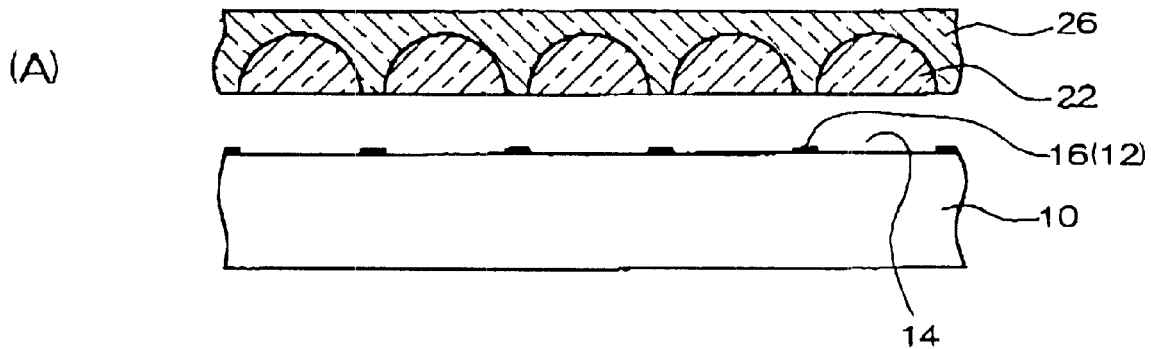
FIGS. 7(A) and 7(B) are drawings showing the method of manufacturing the microlens array according to the first embodiment.
Figure 7:
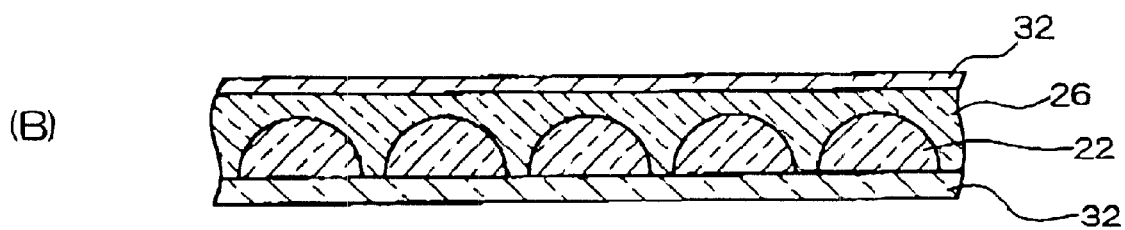

The first and the second light transmitting layers 22 and 26 are removed from the master 10 together, as shown in FIG. 7(A). If the layer 12 above the second area 16 remains above the master 10, the master 10 can be used for manufacturing another microlens array. The layer 12 may be attached to the second light transmitting layer 26 if the layer 12 has an extremely small thickness and the like which do not cause a problem.

A protective layer 32 may be formed above at least one of the first light transmitting layer 22 and the second light transmitting layer 26 (for example, both), as shown in FIG. 7(B). The material for the protective layer 32 is not limited as long as it has resistance characteristics for the following steps. For example, an inorganic material may be used, and specifically, a glass precursor in the liquid state, such as polysilazane or polysiloxane, may be used to form the protective layer 32.

The protective layer 32 may be formed of a ceramic. The layer 32 may be formed of silicon dioxide ($SiO_2$) as in the formation of quartz glass (silicate glass). Silicon dioxide ($SiO_2$) has a hard surface, thermal stability, water resistance, chemical resistance, and durability and can be prepared at low cost. The protective layer 32 may be formed of colloidal silica (silica sol) or a material mainly containing silica sol and a silane coupling agent. The silane coupling agent contributes to the improvement of the adhesion between the first and the second light transmitting layers 22 and 26. A surface-active agent for increasing surface wettability or a catalyst for accelerating a reaction may be added. The silica sol (or the material mainly containing silica sol and a silane coupling agent) can be provided in a planar manner at a low temperature.

Surface finishing (for example, plasma polymerization or silane coupling) may be applied to the surfaces of the first and the second light transmitting layers 22 and 26 to improve the adhesion to the protective layer 32 and the wettability before the protective layer 32 is formed.

If the first light transmitting layer 22 or the second light transmitting layer 26 has resistance characteristics for processes, the protective layer 32 is not necessary. Thus, the microlens array is completed. The microlens array comprises the first light transmitting layer 22 and the second light transmitting layer 26.

Figure 8:
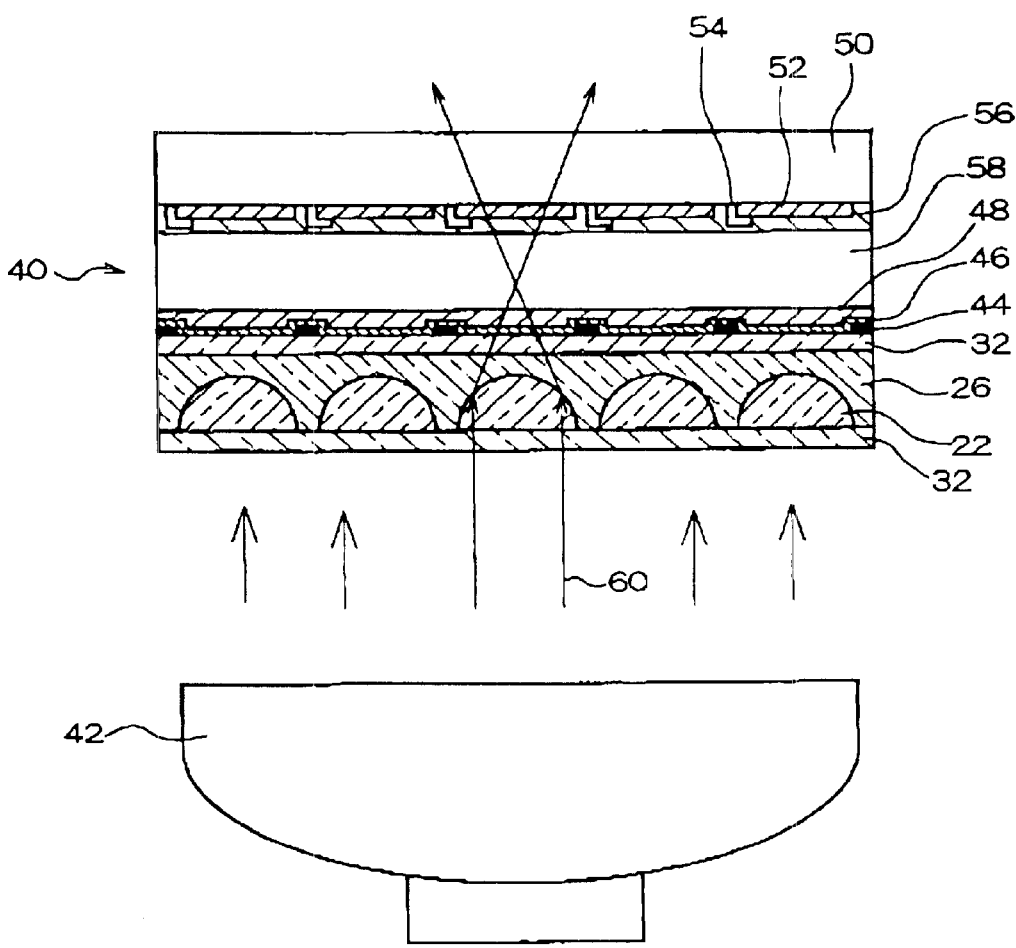
FIG. 8 is a drawing showing an optical device comprising a microlens array according to the present invention.

FIG. 8 shows part of an exemplary LCD projector as an optical device using a microlens array according to the embodiment. The LCD projector comprises a light valve 40 containing the microlens array manufactured by the method according to the embodiment described above and a lamp 42 serving as a light source.

In the microlens array, the first light transmitting layer 22 serving as a plurality of lenses is disposed in a concave manner when viewed from the lamp 42. The microlens array comprises a black matrix 44, an electrode (electrode layer) 46, and an orientation layer 48. They may be formed above the protective layer 32 or, if the protective layer 32 is not formed, above the second light transmitting layer 26.

The black matrix 44 is formed by etching a chromium film.

The protective layer 32 is resistive to this etching step. If the second light transmitting layer 26 is resistive to this etching step, the protective layer 32 is not necessary. The electrode 46 is formed with, for example, an ITO (indium tin oxide) film formed by a vacuum film-forming method, such as sputtering or evaporation coating, followed by annealing. Annealing is generally performed at temperatures of 100 to 300° C., and is preferably performed at a high temperature because a higher temperature lowers the resistance more, thus leading to a high-quality electrode layer. The orientation layer 48 is formed by coating a polyimide resin or a precursor material for the resin and subsequently by firing the coated material at a temperature of 100 to 350° C. For this coating, spin coating, roll coating, flexographic printing, or the like can be used. The firing temperature can be set according to the material used. The firing for forming the orientation layer 48 and the annealing of the electrodes 46 may be performed concurrently.

A TFT substrate 50 is disposed above the orientation layer 48 with a gap therebetween. The TFT layer 50 has individual transparent electrodes 52 and thin-film transistors 54 covered with an orientation layer 56. The TFT substrate 50 is disposed so that the orientation layer 56 opposes the orientation layer 48.

Liquid crystal 58 is sealed between the orientation layers 48 and 56, and is driven by a voltage controlled by the thin-film transistors 54.

By using the LCD projector formed in this manner, in which light 60 emitted from the lamp 42 is focused by the first light transmitting layer 22 serving as lenses, a bright display can be achieved.

Figure 9:
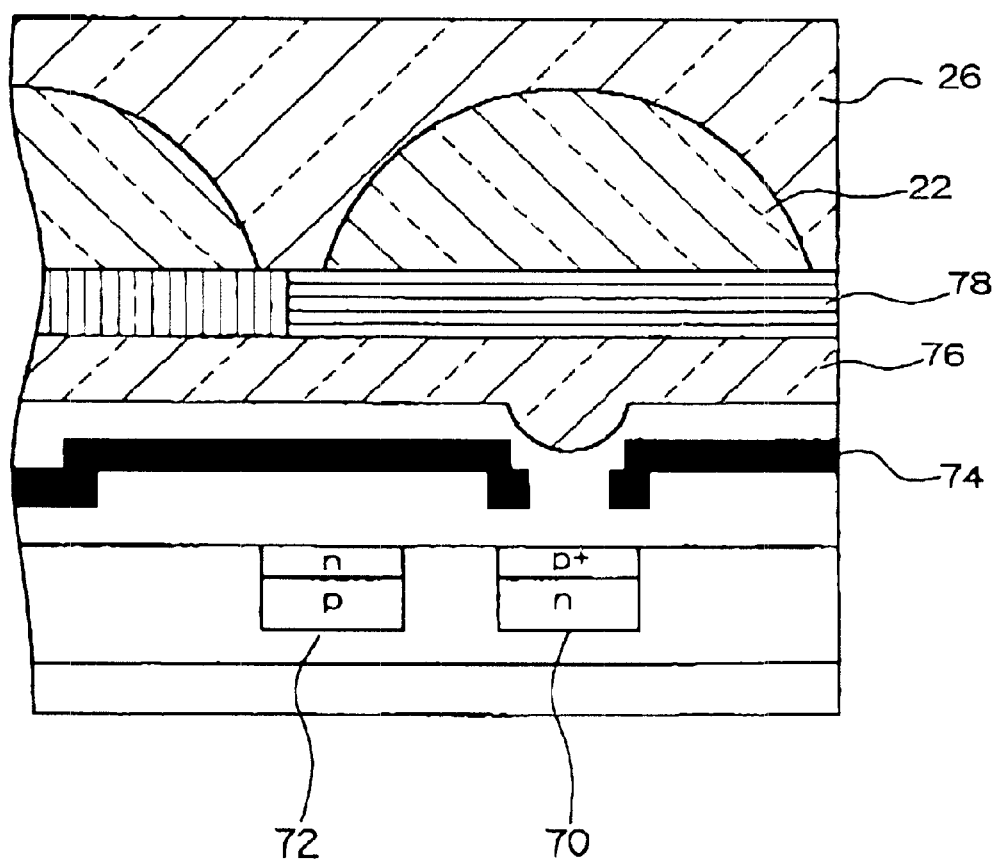
FIG. 9 is a drawing showing an optical device comprising a microlens array according to the present invention.

FIG. 9 shows an imaging device as an example of an optical device. The imaging device comprises imaging elements (image sensors). In the case of, for example, two-dimensional image sensors, the sensors have individual light-receiving sections (for example, photodiodes) 70 corresponding to a plurality of pixels. In the case of CCD (charge coupled device) type imaging elements, the elements have transferring sections 72 for transferring charges from the light-receiving sections 70 for the pixels at high speed. A shielding layer 74 or an in-layer lens 76 may be formed to prevent light from entering each light-receiving section 70 from pixels other than the pixels corresponding to the light-receiving section 70. A color imaging element may have color filters 78. If the microlens array serves as color filters, the color filters 78 are not necessary.

The microlens array according to the present invention is mounted above the imaging elements. The microlens array comprises the first light transmitting layer 22 and the second light transmitting layer 26. The interface between the first and the second light transmitting layers 22 and 26 refract light, thereby focusing the light. The lenses are formed for each pixel, and the focused light enters the light-receiving sections 70.

(Second Embodiment)

Figure 10:
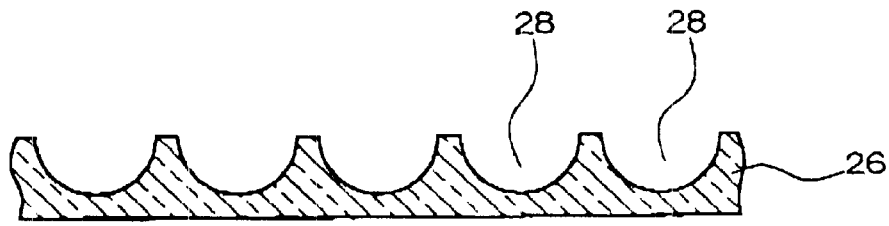
FIGS. 10(A) to 10(C) are drawings showing a method of manufacturing a microlens array according to a second embodiment.
Figure 10:
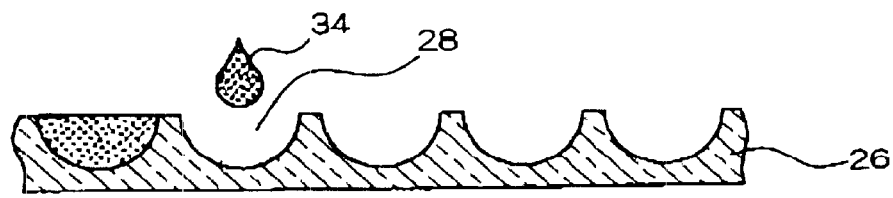
Figure 10:
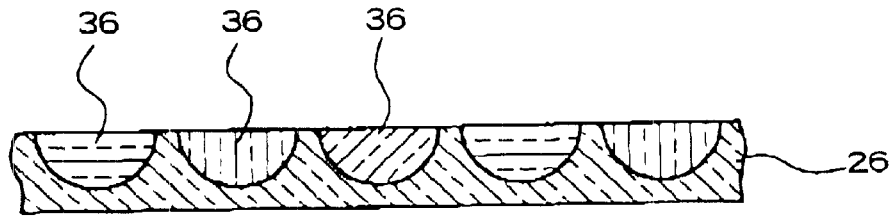

FIGS. 10(A) to 10(C) illustrate a method of manufacturing a microlens array according to a second embodiment of the present invention.

In this embodiment, after separating the first and second light transmitting layers 22 and 26 from the master 10 together, as shown in FIG. 7(A), the first light transmitting layer 22 is removed from the second light transmitting layer 26, as shown in FIG. 10(A), thus forming recessed parts 28 in the second light transmitting layer 26.

As shown in FIG. 10(B), the recessed parts 28 are filled with a third light transmitting layer precursor 34, and thus a third light transmitting layer 36 is formed, as shown in FIG. 10(C). An ink-jet method may be used to fill the third light transmitting layer precursor 34. If a plurality of coloring materials are used as the third light transmitting layer precursor 34 different from the first light transmitting layer precursor 20, the resulting microlens array can serve as color filters. If the coloring material contains a solvent, it is heated to remove the solvent. In this instance, since the coloring material shrinks after removing the solvent, it is necessary to fill such amounts of the coloring materials as maintain a thickness sufficient to ensure a required color intensity.

In the embodiment, the first light transmitting layer precursor 20 is temporally used and is not included in the completed lenses. Suitable materials for the process and the lenses can be used for each of the first light transmitting layer precursor 20 and the third light transmitting layer precursor 34.

The microlens array according to the present invention can be used for the optical devices described above, and preferably, is used for electro-optic devices, such as liquid crystal devices and organic electroluminescence devices. Also, these electro-optic devices are used for electronic devices including: direct viewing displays of various electronic devices including monitors (displays) of personal computers, such as laptop personal computers and notebook-size personal computers, monitors of television sets, monitors of picture phones, and monitors of portable electronic devices, such as cellular phones (including PHS), electronic databooks, electronic dictionaries, electronic cameras (digital still cameras), and video cameras; and projection displays such as projectors.

What is claimed is:

1. A method of manufacturing a microlens array comprising:

providing a master;

defining first areas on said master with a first affinity to a first light transmitting layer precursor;

defining second areas on said master with a second affinity to said first light transmitting layer precursor, said second affinity being different from said first affinity;

providing said first light transmitting layer precursor above said master;

forming a first light transmitting layer above the first areas but not above the second areas with said first light transmitting layer precursor;

providing a second light transmitting layer precursor above the first light transmitting layer;

forming a second light transmitting layer over said second areas with said second light transmitting layer precursor.

2. The method of claim 1 wherein the second light transmitting layer is also formed over said first light transmitting layer.

3. The method of claim 1 wherein said second areas surround said first areas.

4. The method of claim 1 wherein said second affinity is lower than said first affinity.

5. The method of claim 1 wherein said first light transmitting layer precursor includes curved surfaces over said first areas.

6. The method of claim 5 wherein said curved areas are formed by surface tension.

7. The method of claim 1 wherein said first areas are circular.

8. The method of claim 1 wherein said first areas are octagonal.

9. The method of claim 1 wherein said second area repels said first light transmitting layer precursor during said step of providing said first light transmitting layer precursor above said master side that said first light transmitting layer is formed above said first areas, but not above said second area.

10. The method of claim 1 wherein said light transmitting layer precursor is discretely applied to individual first areas during said step of providing said light transmitting layer precursor above said master.

11. The method of claim 1 further comprising:

removing said first light transmitting layer and said second light transmitting layer from said master as a unit.

12. The method of claim 11 further comprising:

removing said first light transmitting layer from said second light transmitting layer to expose a plurality of recesses in said second light transmitting layer.

13. The method of claim 12 further comprising:

filling said recesses with a third light transmitting layer.

14. A method of manufacturing a microlens array comprising the steps of:
  providing a first light transmitting layer precursor above a master to form a first light transmitting layer; and
  providing a second light transmitting layer precursor above the first light transmitting layer to form a second light transmitting layer,
  the master including a plurality of first areas and a second area surrounding the first areas, the second area having a different affinity to the first light transmitting layer precursor than that of the first areas, and
  the first light transmitting layer being formed above the first areas, but not above the second area.

15. An electronic apparatus comprising an electro-optic device comprising a microlens array manufactured by the method according to claim 14.

16. A method of manufacturing an optical device comprising the steps of:
  forming a microlens array by the process according to claim 14; and combining the microlens array with a light source.

17. A method of manufacturing an optical device comprising the steps of:
  forming a microlens array by the process according to claim 14; and
  combining the microlens array with imaging elements such that light focused by the microlens array enters the imaging elements.

18. A method of manufacturing a microlens array according to claim 14, the first light transmitting layer precursor having curved surfaces above the first areas formed by surface tension.

19. A method of manufacturing a microlens array according to claim 14, further comprising the step of curing the first light transmitting layer precursor and then providing the second light transmitting layer precursor above the first light transmitting layer.

20. A method of manufacturing a microlens array according to claim 14, the first areas being formed as circles.

21. A method of manufacturing a microlens array according to claim 14, each first area being formed as an octagon in which opposing sides have substantially the same lengths; adjoining sides have different lengths from each other; and the inner angles are substantially the same.

22. A method of manufacturing a microlens array according to claim 14, the first light transmitting layer precursor being provided above the first and second areas of the master, and being repelled from the second area to the first areas due to the low affinity of the second area to the first light transmitting layer precursor.

23. A method of manufacturing a microlens array according to claim 14, the first light transmitting layer precursor being provided individually in each first area.

24. A method of manufacturing a microlens array according to claim 23, a plurality of coloring materials being used as the first light transmitting layer precursor and being provided so that adjacent first areas have different colors.

25. A method of manufacturing a microlens array according to claim 14, wherein the first areas are formed in the surface of the master and the second area is formed with a film having a lower affinity to the first light transmitting layer precursor than that of the surface of the master.

26. A method of manufacturing a microlens array according to claim 14, further comprising the step of separating the first and second light transmitting layers from the master as a unit.

27. A method of manufacturing a microlens array according to claim 26, further comprising the steps of:
  removing the first light transmitting layer from the second light transmitting layer to form recessed parts after the first and second light transmitting layers are separated from the master as a unit; and
  filling the recessed parts with a third light transmitting layer precursor different from the first light transmitting layer precursor.

28. A method of manufacturing a microlens array according to claim 27, a plurality of coloring materials being used as the third light transmitting layer precursor.

29. An optical device comprising a microlens array manufactured by the method according to claim 14.

30. An optical device according to claim 29, further comprising a light source for emitting light to the microlens array.

31. An optical device according to claim 29, further comprising imaging elements which the light focused by the microlens array enters.

* * * * *

UNITED STATES PATENT AND TRADEMARK OFFICE
CERTIFICATE OF CORRECTION

PATENT NO. : 6,535,338 B2
DATED : March 18, 2003
INVENTOR(S) : Takao Nishikawa

It is certified that error appears in the above-identified patent and that said Letters Patent is hereby corrected as shown below:

Title page,
Item [75], Inventors, "Suwa, JP" should be -- Shiojiri-shi, JP --

Column 4,
Line 33, "$C_nF_{2n+1}C_nH_{2m}$" should be -- $C_nF_{2n+1}C_mH_{2m}$ --
Line 42, after "shown" insert -- in --

Signed and Sealed this

Seventh Day of October, 2003

JAMES E. ROGAN
*Director of the United States Patent and Trademark Office*